Dec. 26, 1939.   G. H. MYRICK   2,184,679
INHALATOR
Filed March 22, 1937   3 Sheets-Sheet 1
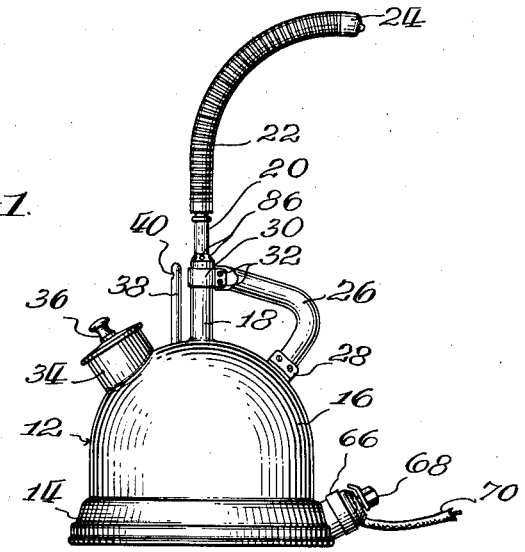
Inventor:
George H. Myrick
By Williams, Bradbury, McCaleb & Hinkle
Attys.

Dec. 26, 1939.   G. H. MYRICK   2,184,679
INHALATOR
Filed March 22, 1937   3 Sheets-Sheet 2
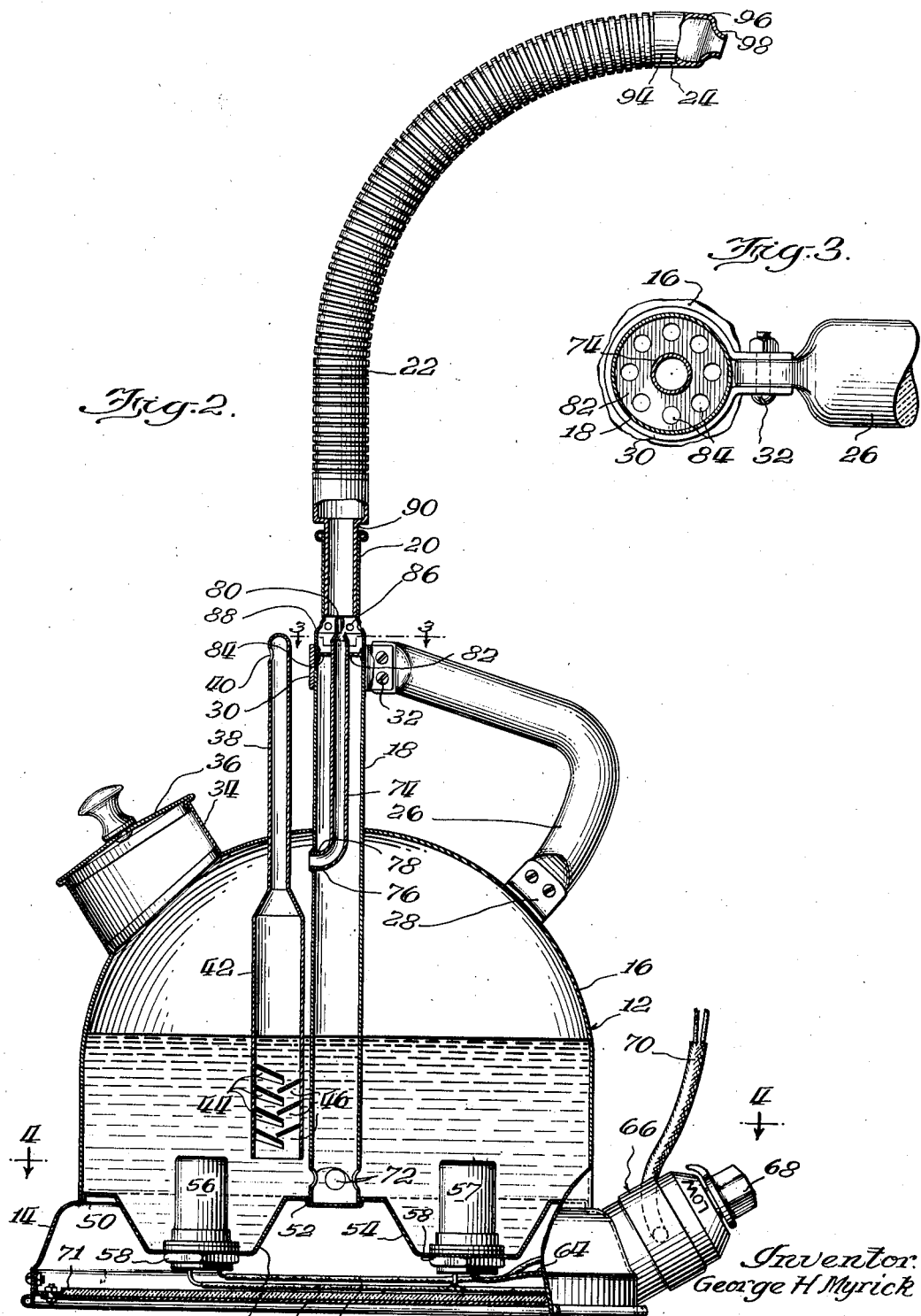

Dec. 26, 1939. G. H. MYRICK 2,184,679
INHALATOR
Filed March 22, 1937 3 Sheets-Sheet 3
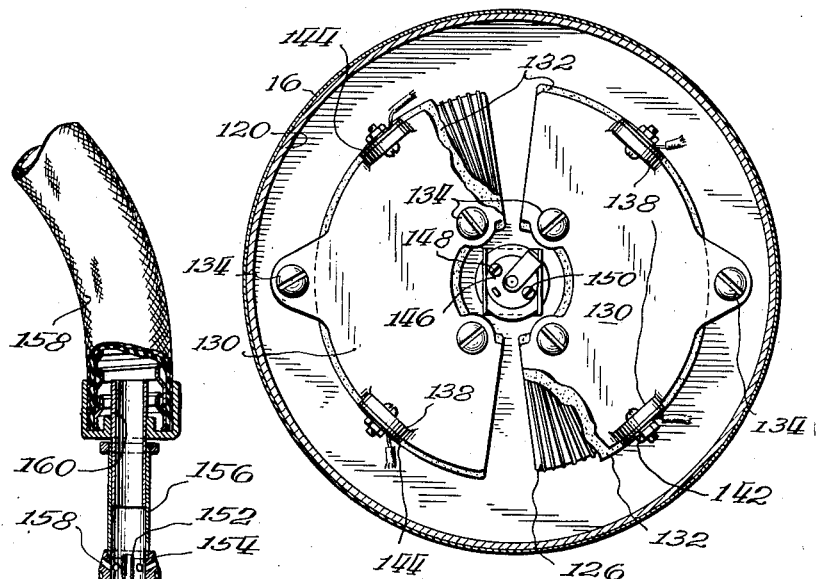
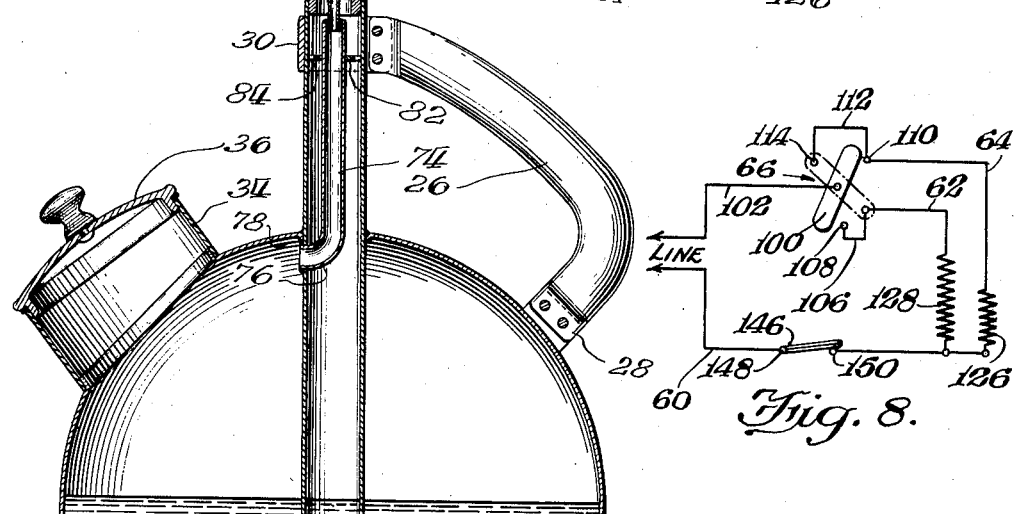
Inventor:
George H. Myrick
By
Williams, Bradbury, McCaleb & Hinkle
Attys.

Patented Dec. 26, 1939

2,184,679

UNITED STATES PATENT OFFICE 2,184,679

INHALATOR

George H. Myrick, Rochester, Minn.

Application March 22, 1937, Serial No. 132,232

11 Claims. (Cl. 128—192)

The present invention relates to inhalators or vaporizers used in the treatment of respiratory ailments and while described in connection with the electrically heated, large capacity inhalator, it is applicable to inhalators generally.

The primary object of the present invention is to provide a new and improved inhalator capable of delivering an adequate supply of properly moistened air to a patient.

A further object of the invention is to provide a new and improved inhalator adapted thoroughly to mix a large amount of air with the steam and generate sufficient pressure to carry the mixture a considerable distance through the air to a patient.

A further object of the invention is to provide an inhalator capable of delivering a mixture of air and steam at a considerable distance from the inhalator at a temperature that is not dangerous to the patient.

A still further object of the invention is to provide a delivery nozzle adapted to be connected to the inhalator, so constructed and arranged that the mixture discharged therefrom is directed downwardly and the escape of condensate therethrough prevented.

Another and further object of the invention is to provide a new and novel means for indicating a fall in water level below a predetermined value.

Another object is to provide an inhalator that is simple and rugged in construction and which can be manufactured economically.

Other objects and advantages of the invention will become apparent from the ensuing description of inhalators constructed in accordance therewith.

In the course of this description reference is made to the accompanying drawings, in which:

Fig. 1 is a side plan view of an inhalator made in accordance with the present invention;

Fig. 2 is an enlarged side plan view, partially in section, of the inhalator illustrated in Fig. 1;

Fig. 3 is a transverse cross-section view taken on the line 3—3 of Fig. 2, showing details of the vapor discharge outlet tube mounting;

Fig. 4 is a transverse cross-section view taken on the line 4—4 of Fig. 2, showing details of the base construction;

Fig. 5 is a diagrammatic representation of the heating circuit used with the inhalator shown in Figs. 1 to 4 inclusive;

Fig. 6 is a side plan view, partially in section, of a modified form of inhalator constructed in accordance with the present invention;

Fig. 7 is a transverse cross-section view, taken on the line 7—7 of Fig. 6, showing the manner in which the heating elements are secured to the under side of the base; and Fig. 8 is a diagrammatic representation of the heating circuit used with the inhalator illustrated in Figs. 6 and 7.

The inhalator illustrated in Fig. 1 is of a relatively large size, adapted particularly for use in hospitals and similar institutions. It comprises a container indicated generally by reference numeral 12, formed of an integral inverted cup-shaped base 14 and a substantially hemispherical top 16. Extending through the top is a relatively large diameter tube 18 terminating in an integral reduced extension 20, to the end of which is mounted a flexible discharge conduit 22. The conduit 22 is of usual construction and is designed so that it may be bent to a limiting position in which the outer end of the tube is substantially horizontal, as indicated in both Figs. 1 and 2.

A discharge nozzle 24 so constructed and arranged that the mixture of vapor and air discharged therethrough is directed downward and the escape of condensate therethrough prevented is secured to the outer end of the discharge conduit 22. The construction of the nozzle is described in detail hereinafter.

The inhalator is provided with a handle 26 secured at one end to the container top 16 by a bracket 28 secured to the top and at the other end to tube 18 by a ring 30 surrounding the tube and secured to the handle by suitable securing means, such as bolts and nuts 32. The container is adapted to be supplied with a vaporizable medium, usually water, through a tubular extension 34 secured in suitable manner to the top 16 and provided with a removable lid 36.

Visual indication of a fall in water level below a predetermined point within the container is provided by an alarm comprising a relatively small diameter tube 38 extending outside the container and having a small opening 40 near its upper end. From Fig. 2 it may be seen that the lower end 42 of the tube is made with a larger diameter and extends to a predetermined distance from the bottom. When the water level falls below the end of the tube, the steam escapes to the atmosphere through the opening 40, thereby giving a visual indication that the supply of water should be replenished.

To prevent the escape of water along with the steam that escapes through the alarm, the lower end 42 thereof is provided with a plurality of oppositely disposed and vertically aligned baffles 44 and 46. The baffles slope downward and to one side, as may be seen from Fig. 2 and are of a size such that the adjacent ends thereof overlap slightly, as shown in Figs. 2 and 4. The overlapping construction provides a tortuous path for the escaping steam and the double slope of the baffles tends to force the condensate to flow down one side of the tube while the steam flows up the other.

The integral base 14 is preferably stamped from relatively thin metal and is provided with a pair of annular concentric shoulders 50 and 52 and an annular substantially U-shaped channel 54 providing supports for the tube 18, top 16 and heating elements 56 and 57, respectively. The heating elements project into the container to a level approximately the same as the lower end of tube 42 and are secured to the bottom part of the annular channel 54 by nuts 58. The described construction of the base increases the capacity of the container and reduces the volume of water remaining therein when the end of tube 42 is unobstructed so that steam may escape therethrough.

The heating elements 56 and 57 are preferably constructed with different heating capacities so that the amount of steam generated may be controlled. Energy is supplied to the heating elements through a common conductor 60 and individual conductors 62 and 64 leading to elements 56 and 57, respectively.

The supply of energy to and connection of heaters in the circuit are controlled by a switch 66 secured to one side of the base 14 and provided with a manually operable selector knob 68. Energy is supplied to the heating elements from any suitable source, not shown, by a conductor 70 leading from the source to the switch 66. The heat generated by the heating elements is prevented from affecting any support on which the inhalator may be placed by a heat-insulating bottom 71 suitably secured to the side walls of the base 14.

As previously stated, the shoulders 50 and 52 support the top 16 and the tube 18 of the inhalator. The lower part of the lateral side wall of top 16 engages the vertically extending portion of the outer shoulder 50 and rests against the horizontal portion thereof. The lower end of the tube 18 similarly engages the vertically extending portion of shoulder 52 and rests against the horizontal portion thereof. Both the top and tube are secured to the shoulders in water-tight fashion.

The water within the container flows freely into and out of the interior of tube 18 through a plurality of openings 72 provided near the lower end of the tube for a purpose that is described fully hereinafter.

The steam generated in the upper part of the container is led to the flexible discharge conduit 22 through a relatively small diameter outlet tube 74 having its lower end 76 sealed to an opening 78 provided in the tube 18 just below the upper part of top 16. The upper end of tube 74 is provided with a reduced nozzle-defining portion 80 and is supported concentrically with respect to tube 18 by an annular disc 82 provided with a series of perforations 84, as may be clearly seen in Fig. 3.

A large supply of air for mixture with steam discharged through the outlet tube 74 is supplied through a plurality of openings 86 surrounding and located just below the nozzle-defining portion 80 of the outlet tube. These openings are formed in the conical portion 88 connecting the tube 18 and the previously mentioned integral reduced extension 20 and are sealed from the steam-containing part of the container. As the steam is discharged from the outlet tube air is drawn through the openings 86 by the injector principle and thoroughly mixed with the steam as they flow through the discharge conduit 22.

The discharge conduit 22 is removably mounted in the reduced extension 20 by means of a fitting 90 secured to the conduit and insertable into the extension.

The construction of the previously mentioned nozzle 24 is illustrated in Fig. 2, where it is seen to comprise a relatively large diameter tubular portion 94 secured to the end of the flexible tube, intermediate portion 96 of tubular section having a substantially triangular form in elevation, and a tip 98 comprising a tubular portion, the diameter of which decreases with the length thereof. It may be seen from the last mentioned figure that the mixture of steam and air flowing through the flexible conduit 22 to the discharge nozzle 24 is discharged through the tip of the latter in a downward direction. The construction of the tip 98, with the diameter gradually decreasing with its length, provides an upwardly extending projection which prevents the escape of condensate with the steam. Condensate collected in the nozzle is returned to the container through the flexible tube 22 and tube 18, the condensate flowing into the tube 18 through the openings 84 in the annular disc 82 supporting the upper end of the outlet tube 74.

The electrical circuit and control switch for the heating elements are illustrated diagrammatically by the solid lines of Fig. 5. From this figure it is seen that the common conductor 60 is directly connected to one of the line conductors and that the opposite ends of the heating elements 56 and 57 are connected to the switch 66 by the conductors 62 and 64. The switch 66 comprises a movable contact member 100 movable from the "off" position in which it is illustrated, to "low", "medium", and "high" heat positions. The movable contact is connected by a conductor 102 to the other line terminal. Conductor 62 is connected directly to a fixed contact 104 and by conductor 106 to a second fixed contact 108. Conductor 64 is similarly connected to a first fixed contact 110 and by conductor 112 to a second fixed contact 114.

With the switch in its indicated position, no energy is supplied to the heating elements. When the switch is moved to engage contact 110, energy is supplied to the low capacity heating element 57. When the switch is moved to engage contact 108, the high capacity heating element 56 is supplied with energy, and when the switch is actuated to engage both contacts 104 and 114, the two heating elements are energized in parallel, thereby furnishing the greatest possible amount of heat.

The operation of the inhalator described above is the same no matter which of the heating positions the switch 66 is turned to, the only difference resulting from the operation of the switch to different positions being in the amount of steam generated.

Whenever it is desired to operate the inhalator, the container 12 is supplied with water to a level substantially as indicated in Fig. 2, and the switch 66 actuated to one of its "on" positions. Steam is generated in the upper part of the container 12 and is directed through the outlet conduit 74 and nozzle 80 into the flexible discharge conduit 22. The steam is discharged through nozzle 80 with considerable velocity and draws a large amount of air through the openings 88 for mixture therewith. The proximity of the openings 86 to the nozzle 80 insures a large quantity of air for mixture with the steam. Accordingly, the heating elements 56 and 57 may be made quite large in order to generate considerable steam within the container. Naturally, the generated steam is at a considerable pressure and high temperature, but the arrangement described provides sufficient air for mixture with the steam so that the temperature of the resulting mixture is decreased to a value that is not dangerous to patients.

The above described construction of nozzle 24 with the tip 98 directed downwardly and the end of the tip extending upward, directs the mixture of air and steam downward and also prevents the escape of condensate formed in conduit 22. The condensate is returned to the container through the tube 18 and the openings 84 provided in the annular disc 82 supporting the upper end of outlet tube 74. Because of the free passage of liquid from the container into and out of tube 18, the condensate is returned to the main body of water.

In operation, the water level inside of tube 18 is somewhat higher than the water level in the container proper, for the reason that the pressure generated in the container is sufficient to force some water through openings 72 into the interior of tube 18 and thereby raise the level of water therein. As the water is evaporated, the water level in both the tube and container gradually falls until it reaches the bottom of tube 42, at which time the steam will escape through the opening 40 at the upper end of the alarm tube 38, thus providing a visual indication of the water level. The discharge of water with this steam through the indicator tube is prevented, as described above, by the baffles 44 and 46 placed in the enlarged portion 42 of the alarm tube.

From the above description of the construction and the operation, it may be seen that the inhalator may be constructed with a large capacity and that the inhalator is not likely to be clogged by the deposit of foreign materials inside thereof.

The construction of the modified form of inhalator illustrated in Fig. 7, is substantially the same as that shown in the previously described figures, with the exception, in substance, that the base has been changed to accommodate a different type of heating element and the reduced integral extension formed at the end of tube 18 has been replaced by a separate small diameter tube suitably secured in relation thereto. A different type of flexible discharge tube is also illustrated.

In the description of the modified construction, the unchanged portions are denoted by reference numerals used previously.

The base 120 is made of a bronze casting and is provided with a pair of concentric shoulders 122 and 124 adapted to support the top 16 and tube 18, respectively. A pair of flat heating elements 126 and 128 are supported beneath the bottom of the base by a pair of plates 130 spaced from the heating elements by insulating members 132 and held in place by a plurality of screws 134 extending into upstanding bosses 136 formed on the upper side of the base 120. The supporting plates 130 are provided with downwardly extending lugs 138 forming supports for the terminals 142 of the heating elements. The terminals are insulated from the lugs by insulating washers 144.

The alarm device of the previously described modification has been replaced by a thermal cutout 146 suitably secured to the bottom of the base and provided with terminals 148 and 150 adapted to be placed in circuit to cut out the supply of energy to the heating elements whenever the supply of water within the container has been exhausted. The circuit connections are not illustrated in detail in Fig. 6, but are shown in Fig. 8 from which it can be seen that the thermal cut-out 146 has been interposed in the common conductor 60 between the source of supply and the heating elements 126 and 128 which have been substituted for elements 56 and 57 of the previously described modification.

The integral nozzle 80 formed on the end of the small diameter outlet tube 74 has been replaced by a small diameter nozzle 152 suitably secured to the end of tube 74. Likewise, the integral conical portion 88 and reduced extension 20 of the previously described modification have been replaced by a connecting sleeve 154 and tube 156. The sleeve is provided with openings 158, corresponding to openings 88, which, like the latter, are located slightly below the nozzle 152.

Secured to the tube 154 is a flexible discharge conduit 158 corresponding to the flexible conduit 22, but provided with an outer covering of fabric in order that it may be handled without danger of injury. The conduit 158 is connected to tube 156 by a sleeve 160 adapted to slidably fit into tube 154.

The operation of the inhalator just described is substantially the same as that of the modification first described. The inhalator is supplied with a suitable amount of water and knob 68 of the switch 66 turned to a desired position. The heating element or elements, depending on the selection made, are then supplied with energy through a circuit including the termal cut-out 146. If the water supply is exhausted before the switch is turned to its "off" position, the thermal cut-out is heated and operated to break the heating circuit. The danger of burning out the heating elements is thus eliminated.

The generation and discharge of steam from the inhalator of modified form is the same as that previously described and, therefore, it is not believed necessary to repeat it.

While specific embodiments of the invention have been described in detail above, it is to be understood that the invention is not limited to the details described, but that the scope thereof is defined in the following claims.

I claim:

1. In a device of the character described, the combination including, a container adapted to contain a supply of vaporizable medium, means for heating the medium contained in said container, a tube extending from the bottom of said container through the top thereof, means permitting free passage of the medium from the container into the tube near the bottom of said container, and means including an opening in said tube near the top of and inside said container and a small diameter tube extending from said opening vertically upward in said first mentioned tube for discharging vapor from said container.

2. In a device of the character described, the combination including, a container adapted to contain a supply of vaporizable medium, means for heating the medium in said container, a tube extending from the bottom of said container through the top thereof, means permitting free passage of the medium from the container into the tube near the bottom of the container, and means including an opening in said tube inside of and near the top of said container, a small diameter tube extending upward in said first mentioned tube from said opening, and a plurality of openings in said first mentioned tube outside said container and near the upper end of the second tube for discharging a mixture of vapor and air through said first mentioned tube.

3. An inhalator including, in combination, a container adapted to contain a supply of vaporizable medium, means for heating the medium in said container, a tube extending from the bottom of said container through the top thereof, a flexible tubular discharge conduit mounted on the upper end of said tube, means permitting free passage of the medium from the container into the tube near the bottom of the container, and means including an opening in said tube near the top of and within said container, a small diameter tube extending upward from said opening in said first mentioned tube, and a plurality of openings to the atmosphere near the end of said small diameter tube for discharging a mixture of air through said discharge conduit, said first mentioned tube providing means for draining the condensate formed in said discharge conduit into said container.

4. An inhalator including, in combination, a container adapted to contain a supply of vaporizable medium, means for heating the medium in said container, a relatively large diameter tube extending from the bottom of said container through the top thereof, a flexible tubular discharge conduit mounted on the upper end of said tube, means permitting free passage of the medium from the container into the tube near the bottom of the container, an opening in said tube near the top of and within said container, a small diameter tube extending upward from said opening in said first mentioned tube, said tube being secured to the first mentioned tube at its lower end to seal the latter tube from the interior of said container, an annular perforated disc secured to said first mentioned tube for supporting the upper end of said small diameter tube, and a plurality of openings to the atmosphere near the end of said small diameter tube for supplying air for mixture with the vapor as the latter is discharged into said discharge conduit through the small diameter tube, said large diameter tube and perforated disc providing means for draining condensate formed in said discharge conduit into said container.

5. An inhalator including, in combination, a container adapted to contain a supply of vaporizable medium, means for generating vapor in said container, a flexible conduit adapted to be curved to a limiting position in which its outer end is substantially horizontal in communication with the vapor-containing part of the container, and a nozzle mounted at the end of said conduit adapted to direct the vapor downward and prevent escape of condensate.

6. An inhalator including, in combination, a container adapted to contain a supply of vaporizable medium, means for generating vapor in said container, and means including a relatively large diameter flexible conduit adapted to be curved to a limiting position in which its outer end is substantially horizontal, and a nozzle secured thereto for discharging the generated vapor, said nozzle having a relatively large diameter portion adapted to be secured in communicating relationship with said conduit, an intermediate portion of tubular section having a substantially triangular form in elevation and an end portion the diameter of which decreases with the length thereof for directing the vapor downward and preventing escape of condensate formed in said conduit and nozzle.

7. A nozzle for use with an inhalator comprising a relatively large diameter tube adapted to be secured in communicating relationship with the inhalator, having an intermediate portion of a tubular section having a substantially triangular form in elevation and an end portion the diameter of which decreases with the length thereof.

8. In a device of the character described the combination including, an integral base structure provided with a pair of concentric shoulders, a top having the lower part of its side walls in engagement with and supported by the outer shoulder, said base and top forming a container adapted to contain a supply of vaporizable medium, means including heating elements supported beneath said base by plates located below said elements and secured to said base for heating said medium, a tube in engagement with and supported by the inner shoulder, said tube extending outside said top through a central opening in the latter and secured thereto in air-tight manner, means permitting free passage of liquid between the container and the inside of said tube, and means including an opening in said tube near the upper part of and below said top, a small diameter tube extending upward in said first mentioned tube from said opening, and a plurality of openings in said first mentioned tube outside said top and near the upper end of the second mentioned tube for discharging a mixture of vapor and air through said first mentioned tube.

9. In an inhalator the combination including, a container adapted to contain a supply of vaporizable medium, means for heating the medium in said container, a tube extending from below the level of said medium in said container through the top thereof, means permitting free passage of the medium between said tube and container, and means for discharging a mixture of vapor and air through said tube including a small diameter tube providing an outlet for the vaporized medium from within the container into said first-mentioned tube and an air inlet in said first-mentioned tube outside said container and near the upper end of said second-mentioned tube.

10. In an inhalator, the combination including liquid containing means divided into two portions of unequal size, means for heating the medium in the larger of said portions, a relatively large diameter discharge conduit, a small diameter tube providing an outlet for vapor from said larger portion into said discharge conduit, means for supplying air to said conduit adjacent the upper end of said small diameter tube for mixture with the vapor, and means for returning condensate formed in said discharge conduit to the smaller of said portions.

11. In an inhalator the combination including means defining two separate spaces for holding vaporizable medium, means permitting free communication of the medium from one of said spaces to the other, means for heating the medium in the first of said spaces for generating vapor therein, a relatively large diameter discharge conduit, a relatively small diameter outlet for the vapor from said first space into said conduit, a plurality of openings in said large diameter conduit located externally of both said spaces for supplying air to said conduit adjacent the upper end of said smaller diameter tube for mixture with the vapor, and means for returning condensate formed in said discharge conduit to the second of said two spaces.

GEORGE H. MYRICK.